United States Patent
Biswas et al.

(10) Patent No.: US 6,594,666 B1
(45) Date of Patent: Jul. 15, 2003

(54) LOCATION AWARE APPLICATION DEVELOPMENT FRAMEWORK

(75) Inventors: Prabuddha Biswas, Nashua, NH (US); Raja Chatterjee, Nashua, NH (US)

(73) Assignee: Oracle International Corp., Redwood Shores, CA (US)

( * ) Notice: Subject to any disclaimer, the term of this patent is extended or adjusted under 35 U.S.C. 154(b) by 234 days.

(21) Appl. No.: 09/669,503

(22) Filed: Sep. 25, 2000

(51) Int. Cl.[7] .......................... G06F 7/00; G06F 17/00
(52) U.S. Cl. ..................................... 707/100; 707/102
(58) Field of Search ................................ 707/100, 102

(56) References Cited

U.S. PATENT DOCUMENTS 5,948,040 A * 9/1999 DeLorme et al. ............ 701/201

OTHER PUBLICATIONS

Oracle Spatial User's Guide and Reference, Release 8.1.6, Feb. 1999, 322 pages, Oracle Corporation (Oracle Part No. A77132–01) USA.

Oracle8i interMedia Audio, Image, and Video User's Guide and Reference, Release 8.1.5, Feb. 1999, 616 pages, Oracle Corporation (Oracle Part No. A67299–01) USA.

Oracle8i intermedia Locator, User's Guide and Reference, Release 8.1.5, Feb. 1999,, 42 pages, Oracle Corporation (Oracle Part No. A67298–01) USA.

* cited by examiner

Primary Examiner—Safet Metjahic
Assistant Examiner—Cindy Nguyen
(74) Attorney, Agent, or Firm—Sanjay Prasad

(57) ABSTRACT

A shareable application program interface (API) infrastructure which is used in combination with a relational database to provide data storage and processing functions for location-aware objects, including particularly mobile objects whose current position is periodically updated by a position determining system. Client and service tables in the relational database are used to store the current point location, and other data, representing virtual objects, including mobile objects. A region table stores that describing the geometry and characteristics of geographical regions having defined boundaries within which the client and service objects reside. For each client, the set of services used by that client is recorded in a client profile database table. The services available on the system which are position-dependent have a geographical location associated with them. The API makes available an assortment of location dependent processing functions which may be used by location aware applications.

22 Claims, 2 Drawing Sheets

LOCATION AWARE APPLICATION DEVELOPMENT FRAMEWORK

FIELD OF THE INVENTION

This invention relates to a framework for developing location-aware computer programs.

BACKGROUND OF THE INVENTION

The decreasing cost and size of mobile computing and communications devices, and their increasing capabilities, contributes to the explosive growth in new mobile systems and applications. Laptop and handheld computers, as well as Personal Digital Assistants (PDA's) commonly use wireless communications to connect to a network of available services. At the same time, mobile and cellular telephones increasingly incorporate computing capabilities with Internet access. In the near future, most appliances will also incorporate communications interfaces for remote management. These advances, together with other technologies like "active badges" and inexpensive position sensing devices, will continue to increase the popularity of location-aware applications.

Many location-aware computer and communications already in use employ locationla dependent data so that the geographic location of both service providers, their clients, and other entities can be taken into account for a variety of purposes. These applications include navigation, fleet management, resource location and mapping services, many of which are provided over the Internet. As Global Positioning System (GPS) devices and other positioning technologies become more accurate and less expensive, the number and variety of location-aware applications will continue to grow dramatically.

Unfortunately, developers of these diverse applications have been and will continue to be required to independently code and integrate location aware functions into these new applications. These duplicative efforts yield unnecessarily expensive mechanisms which are often incompatible with one another.

SUMMARY OF THE INVENTION

It is accordingly an object of the present invention to provide an infrastructure which may be used by disparate applications to support location-aware functions and data storage for both fixed and mobile entities.

It is a further object of the invention to provide location-dependent functions for fixed and mobile entities that employ different positioning systems, different input/output devices, and different networking technologies, while allowing these entities to more easily work together.

It is a still further object of the invention to store location and context information which describes location-aware entities in a secure, relational database system which allows authorized users access to appropriate information.

It is a further object of the invention to provide an application infrastructure for specifying and modifying location-aware data objects stored in a relational database, for tracking the location of mobile objects, for responding to queries about the objects and the related data which defines those objects, for specifying events and for handling notifications concerning events, and for providing data caching and replication services which more rapidly process frequently used location information.

The present invention takes the form of a shareable infrastructure which is used in combination with a relational database to provide data storage and processing functions for location-aware objects, including particularly mobile objects whose current position is periodically updated by a position determining system.

In accordance with the invention, the infrastructure employs a database schema which employs client and service tables to store the current point location, and other data, representing virtual objects, including mobile objects. The infrastructure further includes a region table which contains data describing the geometry and characteristics of geographical regions having defined boundaries within which the client and service objects reside. For example, postal code boundaries may be one of the types of regions stored in the system. The clients store data indicating their interest in a set of services and that data is recorded in a client profile database table. The services available on the system which are position-dependent have a geographical location associated with them. The location information of services is also stored in the database repository. The location of the client is determined using positioning services and stored in a database. The last known location of the client as well as a past history of locations for each client is stored. To enhance performance, an additional table may be stored that maps the client's current location to one of the geographical regions (e.g. location of client within a postal code).

The infrastructure further exposes location-dependent services, including event services and location-based queries, to application programs via an infrastructure API which extends the capabilities of the RDBMS and enables developers to easily incorporate location-aware data storage and functionality into their programs to support mobile objects without special programming.

These and other objects, features and advantages of the invention will become more apparent through a consideration of the following detailed description of a specific embodiment of the invention. In the course of this description, frequent reference will be made to the attached drawings.

DETAILED DESCRIPTION

Figure 1:
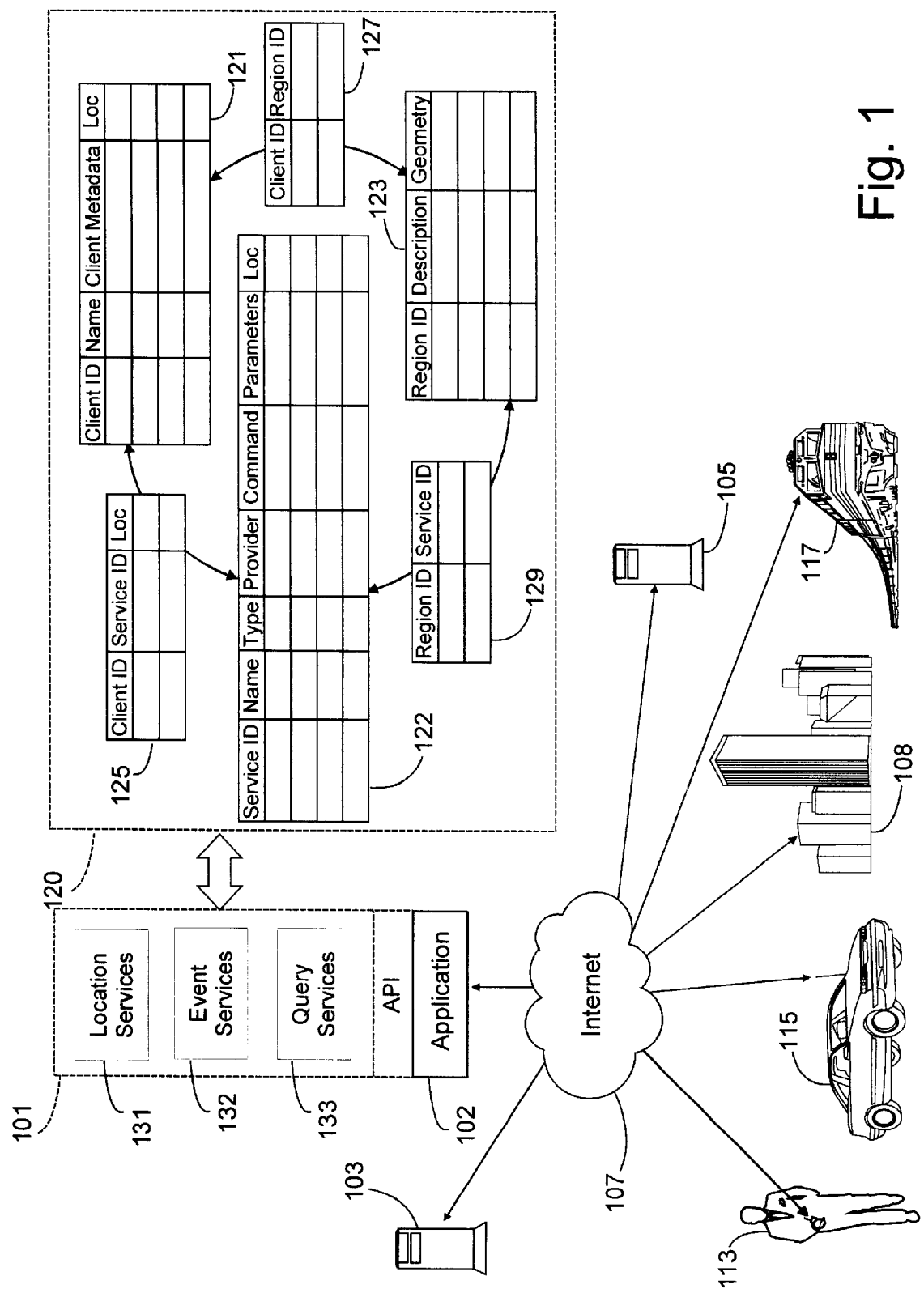
FIG. 1 is a conceptual diagram showing how both stationary and mobile clients and services are interrelated by location mapping data which interrelates their geographic locations in accordance with defined regions of interest.

The present invention provides an infrastructure seen at 101 in FIG. 1 which provides data storage and functional capabilities to an application program 102 for providing services to, and facilitating communications between, a variety of stationary and mobile communications systems. For example, the infrastructure can be used with stationary "services" such as those provided by the Web servers 103 and 105, and stationary client systems, such as the appliances and computers located in an office building as illustrated at 108. Most importantly, the infrastructure contemplated by the present invention includes mechanisms for dynamically tracking the location of mobile systems, such as handheld PDAs, cellular phones, and laptop computers used by travelers as illustrated in FIG. 1 at 113, 115 and 117.

Each of these mobile and stationary systems may be represented in a relational database by a "virtual object"

whose attributes are represented by a database schema as illustrated within the dashed line rectangle 120 in FIG. 1. The schema 120 includes a table 121 containing data regarding "clients," a table 122 containing data regarding "services," and a table 123 which stores data defining the attributes of "regions". The primary key fields, ClientID, ServiceID and RegionID of the tables 121–123 are used to create relationships which are defined by a Client_Service table 125, a Client_Region table 127, and a Service_Region table 129.

Each of the entities modeled by the schema 120 is specified by location data. The data in the LOC (location) column in the client table 121 and the service table 122 specify the current point position for each entity, and each region defined by the region table is specified in that table's geometry column which contains data specifying both the shape and location of the region. When no precise point data is available for a particular client in client table 121, the client can position himself manually with a location specified by an address or street intersection or associate himself with one of the regions available in the region table 123. Similarly, if no precise point data is available for a service specified in the service table 122, its position may be approximated by placing that service within one or more regions specified in the region table 123. Note also that, when precise point location data is available for a point or service, the point data can be matched against the regional geometry data in the region table to dynamically identify the regions that contain that client or service. For stationary client or service objects, these point-to-region comparisons may be done once and matches may be posted into the Client Region table 127 or the service-region table 129 in advance, speeding subsequent processing. For mobile units, the location data is periodically or dynamically updated from the GPS/MPS data, or other available source, and the point-to-region matching may be mapped at update time, or dynamically when needed, at the option of the application program.

The infrastructure 101 contemplated by the invention, unlike existing location-aware infrastructures, includes facilities specifically adapted to handle mobile entities, such as mobile phones, PDA's and other hand held devices. These devices may include built-in GPS (Global Positioning System) receivers for continuously or periodically updating location data for that device which is stored in the client table 121 and associated with a Client ID key value. For details on the Global Positioning System and GPS receivers, see *Understanding GPS: Principles and Applications* by Elliott D. Kaplan (Editor), Artech House; ISBN 0890067937 (1996). In addition, Mobile Positioning Systems (MPS) incorporated into cellular phone systems provide a mechanism for periodically updating location information in the client table 121 for those devices. MPS technology is similar to the satellite-based Global Positioning Systems (GPS) but offers the additional capability of determining location inside buildings, parking garages and other shielded areas such as inside a pocket or briefcase that are inaccessible to GPS systems. MPS Mobile Positioning Systems for GSM cellular phones are offered by Ericsson and SnapTrack, Cell-loc, Cambridge Positioning System, etc.

The application program interface (API) of the infrastructure 101 provides location aware functionality to the application program 102, such as location services 131, event services 132 and query services 133.

The location services 131 permit the application program to map the location of mobile clients to the location of services or other clients within a specified region. Given any location, the infrastructure 101 can return to the application the identification of all mobile and stationary objects within a certain distance from that location. Given the identification of a particular mobile client, the infrastructure 101 can return an identification of all relevant services within a defined region defined region where the mobile client is currently located. Given the identification of any region, the infrastructure can identify all of the clients and services, whether mobile or stationary, that are currently within that region and which have defined attributes.

The location services 131 are implemented in part by query services which are made available to the application 102 via the API presented by the infrastructure 101 These query services process location data which preferably specify the geographic "point" position of each object, when such precise data available, or which approximates object positions by specifying defined regions which contain the objects. Preferably, this location data is stored in a standard format, such as that used by the locator feature in Oracle8i interMedia, a component of the Oracle8i™ database available from Oracle Corporation, Redwood Shores, Calif. This locator feature, and *Oracle Spatial*, and its extensions used with the *Oracle8i Enterprise Edition* product, provides an integrated set of functions and procedures that enables spatial data to be stored, accessed, and analyzed quickly and efficiently in an Oracle8i database. *Oracle Spatial* provides a SQL schema and functions that facilitate the storage, retrieval, update, and query of collections of spatial features in an Oracle8i database, and includes the following components:

a. A schema that prescribes the storage, syntax, and semantics of supported geometric data types;

b. A spatial indexing mechanism;

c. A set of operators and functions for performing area-of-interest and spatial join queries; and d. Administrative utilities.

For more detailed information, see *"Oracle8i interMedia Audio, Image, and Video User's Guide and Reference."* Release 8.1.5, Oracle Corporation (Oracle Part No. A67299-01), 1999, and *Oracle Spatial User's Guide and Reference*, Release 8.1.6, (Oracle Part No. A77132-01), 1997, 1999. Oracle8i interMedia provides standard SQL access to special data types (including multimedia data), and provides services, operators and metadata management for data including these special data types.

The Oracle8i interMedia locator and *Oracle Spatial* products use the geocoding process for converting an address or street intersection information into a geographical location specified by a latitude and longitude. Oracle8i interMedia locator may be used to support web-based searches by proximity from a given location and is designed to facilitate tasks such as supplementing business information with a location attribute (latitude and longitude) and to perform distance queries, and to present a graphical representation of locations for easier visualization by users.

The location data in the client and service tables 121 and 122 may be accessed by relational database operations using locator to support queries based on a specified proximity to a given location. The geographical point locations in the client and service tables, can be readily associated with the region geometry data defined in business data tables as illustrated by the region table 123, such as data defining commercial regions (e.g., downtown, north end, airport, shopping center, subdivision), postal (zip) codes, telephone area codes, etc, or demographic regions. The point-to-geometry matching provided by standard operations on location data available the RDBMS can then be used to build the linking relationship client-region and service-region tables seen at 127 or 129, or the client and service to region matching can be performed dynamically as needed. The proximity search capabilities provided by the RDBMS allow the user to readily locate clients and services which are near to any defined point, including the location of a particular client or service.

Oracle8i interMedia locator uses the Oracle8i extensible indexing framework. This mechanism allows domain-specific data to be indexed and retrieved in the same way as other native datatypes, such as text and number. In Oracle8i interMedia locator, an application can programmatically invoke the Setup_Locator_Index function, which takes the table name and column name as inputs, and automatically builds a locator index. Oracle8i interMedia locator is an application built using components from the Oracle8i Spatial product. Oracle8i interMedia locator supports point-only layers, and performs only the simple, yet powerful, within distance query against the point layer. For more complex analysis, such as lines (for example, a road network) and polygons (areas, boundaries), Oracle8i Spatial provides a more sophisticated engine for data validation, indexing, relate operator use, buffer generation, within distance query options, polygon Boolean operations, and so on.

When business data has been geocoded and indexed in accordance with the client/service/region schema used by the location-aware infrastructure, applications can query against it using proximity queries, such as permitting a mobile client to display the all ATM machines within a given radius of the mobile client's current location. The Locator_ Within_Distance operator provided by interMedia locator takes column of geocoded points in a table (for example, a service table describing all ATM locations in North America), a geometry representing the point or region of interest, and a distance in some units (for example, three miles). If used within a SELECT statement as the WHERE clause, the query will produce all records that satisfy the spatial criteria. Three distance units are supported by this operator: MILE, FT, and METER. If a unit is not specified, a point location is assumed to define latitude and longitude in decimal degrees.

The event services component 132 of the infrastructure allows the user to specify events and receive notification of events provided by the application 102 and its OS environment.

Figure 2:
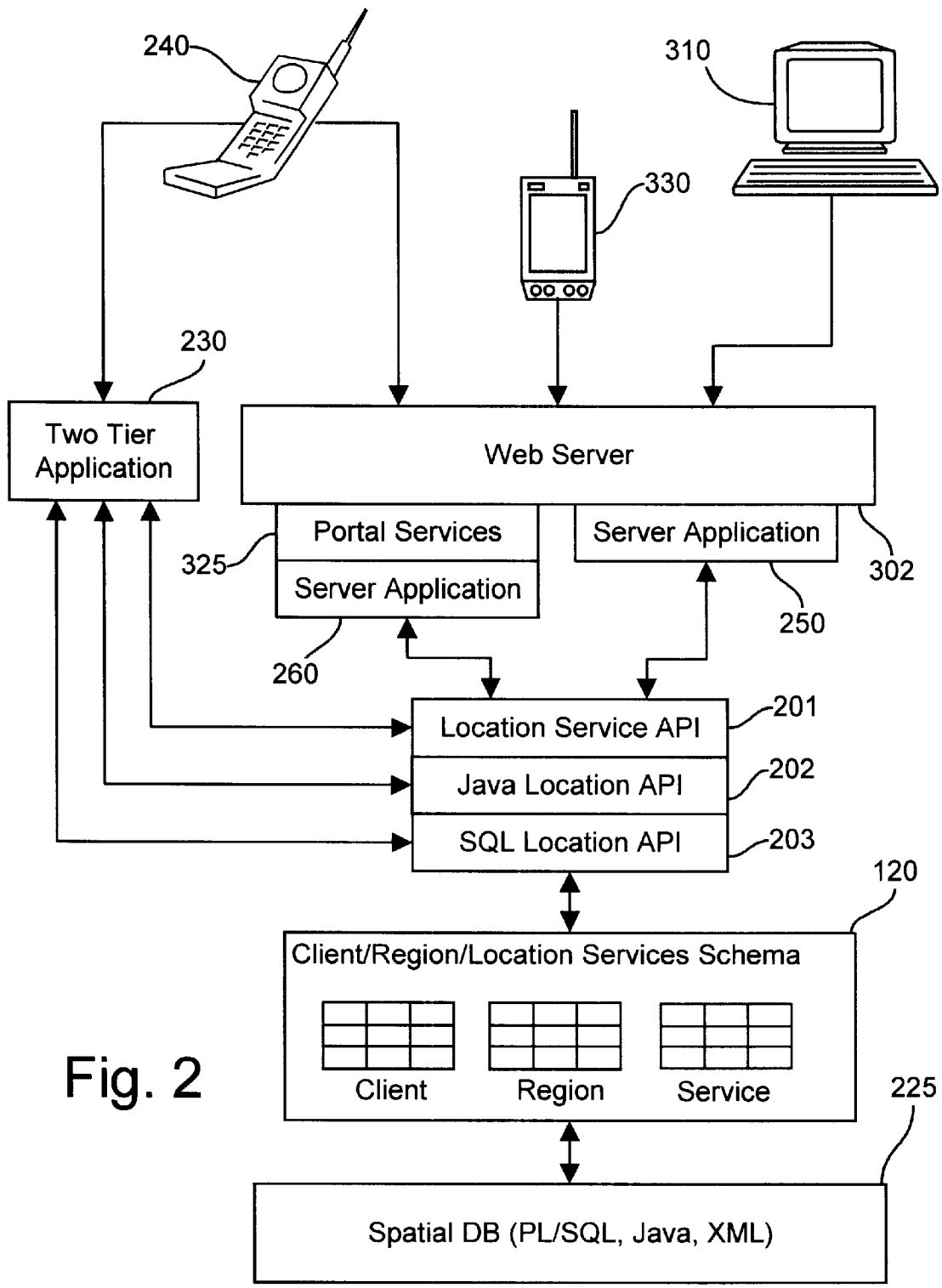
FIG. 2 is a schematic diagram illustrating the manner in which the location-aware infrastructure contemplated by the present invention interfaces with mobile and stationary computing systems and applications executed by these systems.

As illustrated in FIG. 2 of the drawings, location aware infrastructure may be used to advantage in combination with a multi-tier relational database system which provides Internet Web database server capabilities, such as the Oracle8i, Oracle8i Lite (for mobile applications), and Oracle Portal-to-Go.

Oracle8i Lite, available from Oracle Corporation, provides a comprehensive suite of enterprise software to build, deploy, and centrally manage mobile enterprise applications that synchronize data with central database servers. Portal-to-Go is a server component of the Oracle Internet Platform that enables existing database and Internet applications to be made accessible from virtually any device connected to the Internet, including WAP smartphones, wireless PDAs such as the Palm VII product sold by 3Com, standard phones connected to Interactive Voice Recognition (IVR) systems, modem-equipped personal organizers, television set-top boxes, etc. Portal-to-Go provides an infrastructure which renders existing Internet or database applications device independent by extracting their output, dynamically converting it to XML, and in turn to the mark-up language supported by the user's device, including WML, TinyHTML, and voice mark-up language (VoxML). Using Portal-to-Go, mobile operators, content providers, and wireless ISPs may create their own wireless portals, and existing enterprise systems may be seamlessly extended to reach mobile users.

The location-aware infrastructure contemplated by the present invention may be used to extend the capabilities of relational database products like those noted above by extending the database API to provide location aware data, event and query services to applications. These location aware functions are preferably implemented as extensions to the existing Java Location API seen at 202 in FIG. 2, and to the SQL Location API seen at 204. The Java Location provides a Java object view of the data and functions implemented by the database schema 120, while the SQL Location API allows applications to manipulate the database using conventional PL/SQL statements and procedures, and to treat clients, services and regions as objects in the object relational database.

The location data values are stored in the database tables as shown at 220 (120?) in accordance with the client/service/region schema. The location data is preferably processed using the database system's standard geometric data handling functions and queries, such as those provided by *Oracle Spatial* as discussed above, as illustrated at 225.

The application programs that utilize the infrastructure may take a variety of forms. An application program operate in a "two-tier" architecture in which the application program, seen at 230 in FIG. 2, directly communicates with a mobile or stationary device, such as the cellular phone shown at 240, and makes direct calls to the infrastructure using the location server API 201, the Java API 202 and/or the SQL API 203. Other applications providing location-dependent functions may be readily integrated into a multi-tier architecture as indicated at 250 and 260 in FIG. 2. The application at 250 operates as a server application in the environment provided by the Web server 302, using the Web server's HTTP protocol to exchange information with conventional Web browser programs and the like, as illustrated by the desktop client Web client seen at 310. The application program seen at 260 employs the special services of gateway/portal services shown at 325, such as the Oracle Portal-To-Go infrastructure discussed earlier, which permit the application 260 to effectively communicate with devices such as the handheld PDA seen at 330.

Both applications 250 and 260 may also make use of a set of additional location services which are presented via the Location services API seen at 201 in FIG. 2. This API exposes ancillary services, including modeling tools for specifying and modifying geometries which are stored using the schema 120, location tracking and management functions, including the ability to receive and update dynamically changing location data representing mobile objects, event services, and data pre-fetching, caching and replication services which permit frequently used data to be processed more efficiently. The location services API 201 provides an architectural framework which makes scalable location aware data storage and processing functions available to variety of disparate applications, reducing the time and effort needed to develop new location aware applications by eliminating redundant develop efforts while encouraging data and process standardization and sharing by presenting a common interface.

It is to be understood that the specific embodiment that has been described is merely illustrative of one application of the principles of the invention. Numerous modifications may be made by those skilled in the art without departing from the true spirit and scope of the invention.

What is claimed is:

1. Apparatus for performing location-dependent data processing operations comprising, in combination,
   a relational database management system for creating and updating data structures describing fixed and movable objects, said data structures comprising:
      a services table containing information describing each of a plurality of different services, including data specifying the geographic location of each such service,
      a clients table containing information describing client entities which potentially use one or more of the services described in said services table, including data specifying the geographic location of each such client entity, and
      a regions table containing information describing a plurality of geographic regions, including data describing the geographical boundaries which define the geometric extent of each of said geographic regions and additional data which further characterizes each such region,
   means for presenting a standard application program interface for responding to service requests from cooperating computer programs by performing predetermined processing operations with respect to said fixed and movable objects defined by said relational database management system.

2. Apparatus as set forth in claim 1 wherein said client table further stores, for a given one of said client entities, the identity of one or more of said services described in said service table which may be used by said given one of said clients.

3. Apparatus as set forth in claim 1 wherein the location of at least one of said client entities specified in said clients table is movable.

4. Apparatus as set forth in claim 1 wherein the location of at least one of said client entities is mobile and wherein a positioning system is employed to update the data in said clients table specifying the geographic location of said mobile client entity.

5. Apparatus as set forth in claim 4 wherein said data specifying said geographic location of said mobile client entity indicates the last known location of said mobile client entity.

6. Apparatus as set forth in claim 5 wherein said data further specifies the history of past locations for said mobile client entity.

7. Apparatus as set forth in claim 1 wherein said service table further comprises, for at a given one of said services, data describing the nature of the services.

8. Apparatus as set forth in claim 1 wherein said predetermined processing operations include responding to queries which specify a geographic point position by identifying one more fixed or mobile objects having a location related to said point position.

9. Apparatus as set forth in claim 1 wherein said predetermined processing operations include responding to a query that specifies a given geographic region by identifying objects having a location within said given geographic region.

10. Apparatus as set forth in claim 1 further including means for building a client-region linking relationship table which associates each of said client entities with the regions in said region table in which said client entity is currently located.

11. Apparatus as set forth in claim 1 further including means for building a service-region linking relationship table that associates each of said services with the regions in said region table in which each of said services is currently located.

12. The method for performing location-dependent data processing operations which comprises, in combination, the steps of:
   providing a relational database management system for creating and updating data structures describing fixed and movable objects, said data structures comprising:
      a services table containing information describing each of a plurality of different services, including data specifying the geographic location of each such service,
      a clients table containing information describing client entities which use the services described in said services table, including data specifying the geographic location of each such client entity, and
      a regions table containing information describing a plurality of geographic regions, including data describing the geographical boundaries which define the geometric extent of each such region and additional data which characterizes each such region, and
   responding to service requests from cooperating computer programs presented through a predetermined application program interface by performing predetermined processing operations with respect to said fixed and movable objects defined by said relational database management system.

13. The method as set forth in claim 12 wherein said client table further stores, for at a given one of said client entities, the identity of one or more of said services described in said service table which may be used by said given one of said clients.

14. The method as set forth in claim 12 wherein the location of at least one of the clients specified in said clients table is movable.

15. The method as set forth in claim 14 wherein the location of at least one of said client entities is mobile and wherein a positioning system is employed to update the data in said clients table specifying the geographic location of said mobile client entity.

16. The method as set forth in claim 15 wherein said data specifying said geographic location of said mobile client entity indicates the last known location of said mobile client entity.

17. The method set forth in claim 16 wherein said data further specifies the history of past locations for said mobile client entity.

18. The method as set forth in claim 12 wherein said service table further comprises, for at a given one of said services, data describing the nature of the services.

19. The method as set forth in claim 12 wherein said predetermined processing operations include responding to queries which a geographic point position by identifying one more fixed or mobile objects having a location related to said point position.

20. Apparatus as set forth in claim 12 wherein said predetermined processing operations include responding to queries which specify a given geographic region by identifying objects having a location within said given geographic region.

21. The method as set forth in claim 12 further including the step of building a client-region linking relationship table which associates each of said client entities with those regions in said region table in which said client entity is currently located.

22. The method as set forth in claim 12 further including the step of building a service-region linking relationship table that associates each of said services with those regions in said region table in which each of said services is currently located.

* * * * *